(12) United States Patent
Farell et al.

(10) Patent No.: US 8,373,331 B2
(45) Date of Patent: Feb. 12, 2013

(54) USE OF PIEZO MOTOR TO OPERATE A RING POINTER OVER DISPLAY

(75) Inventors: James Paul Farell, Canton, MI (US); Jeffrey A. Turner, Canton, MI (US); Stacee Hamm, Wixom, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 223 days.

(21) Appl. No.: 12/882,489

(22) Filed: Sep. 15, 2010

(65) Prior Publication Data

US 2012/0060747 A1 Mar. 15, 2012

(51) Int. Cl.
*H02N 2/12* (2006.01)
(52) U.S. Cl. .............................. 310/323.01; 310/323.17
(58) Field of Classification Search .......... 310/323.01–323.21, 328
See application file for complete search history.

(56) References Cited

U.S. PATENT DOCUMENTS

| | | | |
|---|---|---|---|
| 4,636,782 A | 1/1987 | Nakamura et al. | |
| 5,198,797 A | 3/1993 | Daidoji | |
| 6,404,103 B1 * | 6/2002 | Suzuki et al. | 310/323.01 |
| 6,484,663 B2 | 11/2002 | Zech et al. | |
| 7,382,237 B2 | 6/2008 | Stoschek et al. | |
| 7,434,536 B2 | 10/2008 | Suess et al. | |
| 7,520,241 B2 | 4/2009 | Pala et al. | |
| 2004/0124743 A1 | 7/2004 | Pease et al. | |
| 2005/0017159 A1 | 1/2005 | Hasegawa et al. | |
| 2005/0109261 A1 | 5/2005 | Tanaka et al. | |
| 2006/0114750 A1 * | 6/2006 | Iida et al. | 368/67 |
| 2007/0040697 A1 | 2/2007 | Sueess et al. | |
| 2008/0223283 A1 | 9/2008 | Fukuda et al. | |
| 2010/0050927 A1 | 3/2010 | Sultan et al. | |
| 2010/0097448 A1 * | 4/2010 | Gilbert et al. | 348/51 |

FOREIGN PATENT DOCUMENTS

| | | |
|---|---|---|
| FR | 2790552 A1 | 9/2000 |
| JP | 2005043287 | 2/2005 |
| JP | 2007103967 | 4/2007 |
| JP | 2008128948 | 6/2008 |
| JP | 2009042034 | 2/2009 |
| KR | 20080036391 | 4/2008 |
| WO | WO2006011335 A1 | 2/2006 |
| WO | WO2007048412 A2 | 5/2007 |

OTHER PUBLICATIONS www.pcbmotor.com (attached data printed from website).

* cited by examiner

*Primary Examiner* — Derek Rosenau
(74) *Attorney, Agent, or Firm* — Fraser Clemens Martin & Miller LLC; J. Douglas Miller (57) ABSTRACT

A display system is disclosed. The display system includes a display for presenting a visual output to a user, a piezoelectric element overlaying the display, and a rotor disposed adjacent the piezoelectric element and in mechanical communication therewith, wherein a selective energizing of the piezoelectric element causes a rotational movement of the rotor.

20 Claims, 6 Drawing Sheets

USE OF PIEZO MOTOR TO OPERATE A RING POINTER OVER DISPLAY

FIELD OF THE INVENTION

The present invention relates generally to a display. In particular, the invention is directed to a display apparatus, a display system, and a method for operating a rotary pointer over the display.

BACKGROUND OF THE INVENTION

Mechanical pointers for instrument clusters and automotive displays typically include mechanical gears or belts as a means for controlling a motion or rotation of the pointer. The gears and belts limit design options and often produce an undesirable level of audible noise.

For example, U.S. Pat. No. 7,434,536 discloses an analog display instrument including an indicator disc having teeth formed on a peripheral edge and a stepper motor adapted to engage the teeth of the indicator disc to cause the indicator disc to rotate.

Certain rotary display elements include a piezoelectric element configured to cause a pointer/indicator to rotate. Specifically, when the piezoelectric element is electrically energized, a shape of the piezoelectric element is extended or contracted. The change in shape of the piezoelectric element is relied upon to control a particular motion of the pointer/indicator.

For example, U.S. Pat. Appl. Pub. No. 2004/0124743 discloses an actuator having a piezoelectric element. Specifically, the piezoelectric element is electrically driven by a signal having a particular waveform, which causes the piezoelectric element to expand slowly and at a pre-determined point, contract quickly. In this way, the relatively slow expansion is used to push a reciprocal drive pad and cause a rotational motion of an optical stage in a first direction. Conversely, the relatively swift contraction of the piezoelectric element causes the mechanical interface between the drive pad and the optical stage to "slip" so that the drive pad can return to an initial position without causing the optical stage to rotate in a direction opposite the first direction.

There remains a need for cost effective and robust apparatus, systems, and methods for driving a dynamic mechanical pointer over a display in automotive instrument applications.

It would be desirable to develop a display system, wherein the system provides a means for selectively controlling a motion of a mechanical pointer in various directions, while maximizing a viewable area of a display associated with the pointer.

SUMMARY OF THE INVENTION

Concordant and consistent with the present invention, a display system, wherein the system provides a means for selectively controlling a motion of a mechanical pointer in various directions, while maximizing a viewable area of a display associated with the pointer, has surprisingly been discovered.

In one embodiment, a display system comprises: a display for presenting a visual output to a user; a piezoelectric element overlaying the display; and a rotor disposed adjacent the piezoelectric element and in mechanical communication therewith, wherein a selective energizing of the piezoelectric element causes a rotational movement of the rotor.

In another embodiment, a display system comprises: a display for presenting a visual output to a user; an annular piezoelectric element overlaying the display, the piezoelectric element having an aperture formed therein, wherein the visual output of the display is viewable through the aperture; and a rotor disposed adjacent the piezoelectric element and in mechanical communication therewith, wherein a selective energizing of the piezoelectric element cause a rotational movement of the rotor.

In yet another embodiment, a display system comprises: a display for presenting a visual output to a user; a printed circuit board overlaying the display, the circuit board having an aperture formed therein, wherein the visual output of the display is viewable through the aperture; an annular piezoelectric element disposed adjacent the printed circuit board and in electrical communication therewith; and an annular rotor disposed adjacent the piezoelectric element and in mechanical communication therewith, wherein a selective energizing of the piezoelectric element causes a rotational movement of the rotor and the visual output of the display is viewable through a center of the rotor.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
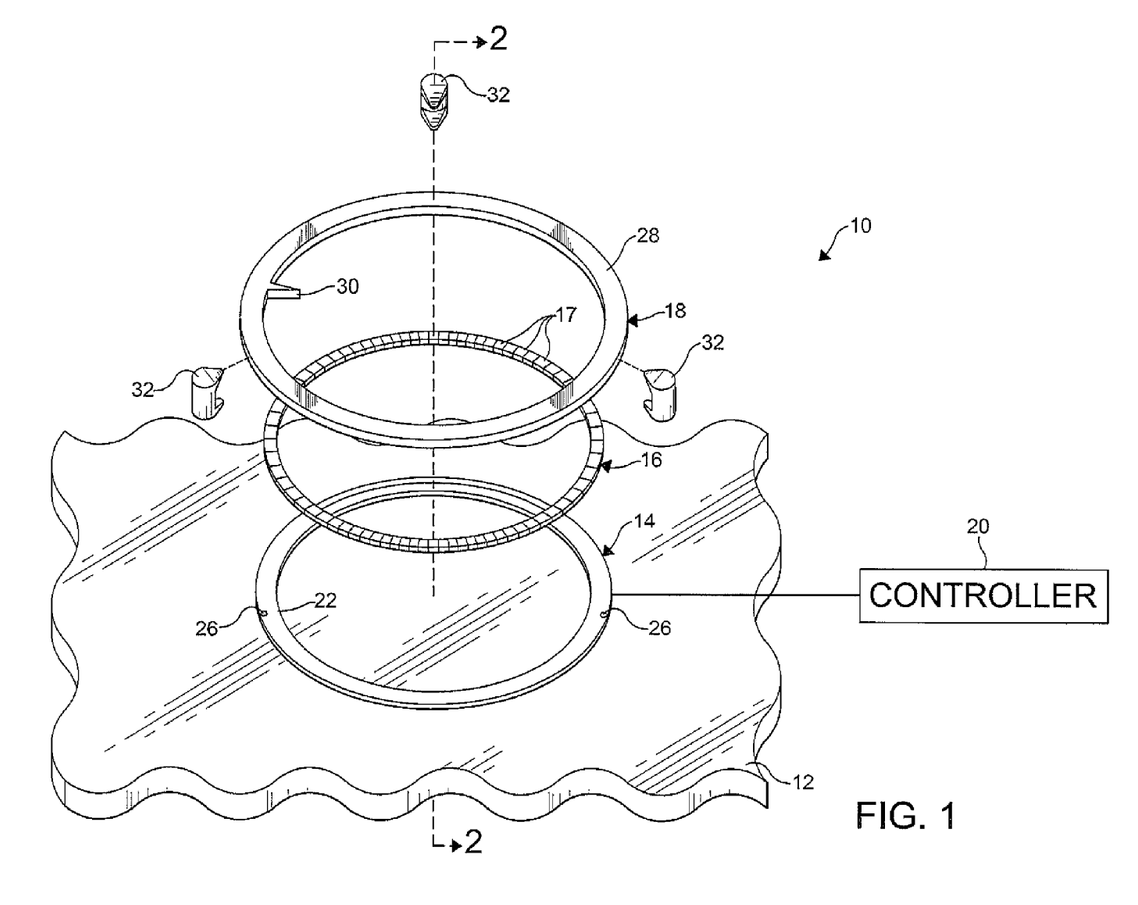
FIG. 1 is an exploded fragmentary perspective view of a display system according to an embodiment of the present invention.
Figure 2:
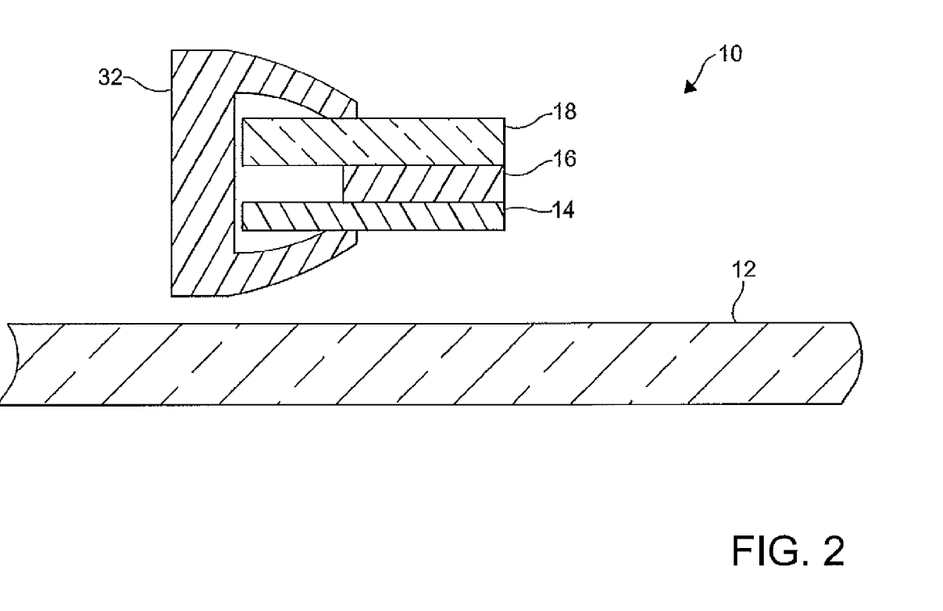
FIG. 2 is a cross-sectional view of the display system of FIG. 1 shown assembled and taken along line 2-2.

FIGS. 1 and 2 illustrate a display system 10 according to an embodiment of the present invention. As a non-limiting example, the system 10 is integrated with an interior of a vehicle (not shown) to communicate a condition of the vehicle to a user. However, the system 10 can be included in other environments for various applications. As shown, the system 10 includes a display 12, a printed circuit board 14, a piezoelectric element 16, a rotor 18, and a controller 20. It is understood that other elements and components can be included in the system 10 such as interface elements for electrically and mechanically interconnecting components of the system 10, for example.

The display 12 is typically a thin film transistor (TFT) display known in the art. However, the display 12 can be any device for presenting a visual feedback to the user such as a liquid crystal display, a reconfigurable display, an instrument cluster, and the like. The display 12 can also include any indicia (not shown) or graphical markings to communicate information to a user.

In certain embodiments, the printed circuit board 14 may be mounted to a portion (e.g. a perimeter) of the display 12. In the embodiment shown, the printed circuit board 14 is spaced from the display 12 and overlayed relative to the display 12. It is understood that printed circuit board 14 can be mounted to other structural components (not shown) in order to maintain a relative spatial relationship with the display 12. As a non-limiting example, the printed circuit board 14 is generally ring shaped with a centralized aperture 22 formed therein. However, it is understood that the printed circuit board 14 can have any shape and size. A plurality of light sources 26 (e.g. light emitting diodes or the like) is mounted to the printed circuit board 14. As a non-limiting example, the light sources 26 are arranged to illuminate at least a portion of the rotor 18. Any light sources can be used to illuminate any component of the system 10.

The piezoelectric element 16 is typically formed from a plurality of piezoelectric crystals 17. As a non-limiting example, the piezoelectric element 16 is generally ring shaped. In an operative position, the piezoelectric element 16 is in electrical communication with the printed circuit board 14. As a non-limiting example, the printed circuit board 14 provides a means to selectively energize and electrically ground the piezoelectric element 16.

The rotor 18 is disposed adjacent the piezoelectric element 16 and in direct or indirect mechanical communication therewith. In the embodiment shown, the rotor 18 includes an annular main body 28 having a pointer 30 extending radially inwardly (or outwardly) therefrom. It is understood that the rotor 18 can have any shape and size and can include any structural indicators extending in a direction therefrom.

In certain embodiments, a plurality of spring clips 32 is disposed adjacent a periphery of a stacked configuration including at least the printed circuit board 14, the piezoelectric element 16, and the rotor 18 to maintain the stacked configuration thereof. As shown, the spring clips 32 are generally C-shaped. However, any clip or clamp can be used to secure a stacked configuration of at least the printed circuit board 14, the piezoelectric element 16, and the rotor 18. It is understood that a contact force (i.e. friction force) between the spring clips 32 and the rotor 18 is pre-determined to allow the rotor 18 to rotate within the spring clips 32. It is further understood the contact force (i.e. friction force) between the spring clip 32 and the rotor 18 is pre-determined to maintain a suitable mechanical communication between the piezoelectric element 16 and the rotor 18.

The controller 20 is in electrical communication with the piezoelectric element 16 to provide a control signal thereto. As a non-limiting example, the control signal has at least one of a sinusoidal waveform and a cosinusoidal waveform. As a further non-limiting example, the piezoelectric element 16 is driven to resonance by a two-phase sinusoidal drive voltage, wherein the angle difference between the phases is 90 degrees. However, any waveform can be used. In the embodiment shown, the controller 20 is in direct electrical communication with the printed circuit board 14 and indirect electrical communication with the piezoelectric element 16 via the printed circuit board 14. It is understood that any electrical configuration can be used to transmit the control signal to the piezoelectric element 16.

In operation, at least the printed circuit board 14, the piezoelectric element 16, and the rotor 18 are configured in stacked relation to one another and disposed adjacent the display 12. In certain embodiments, the printed circuit board 14 is securely mounted to a static structure (not shown) to maintain a position of the printed circuit board 14 relative to the display 12. As a non-limiting example, each of the printed circuit board 14, the piezoelectric element 16, and the rotor 18 is generally ring shaped and a visual output of the display 12 is viewable through the aperture 22. As a further non-limiting example, the spring clips 32 engage a portion of the printed circuit board 14 and a portion of the rotor 18 to maintain a mechanical contact between the piezoelectric element 16 and the rotor 18.

The controller 20 selectively transmits the control signal to the piezoelectric element 16 to energize the piezoelectric element 16 and cause a change in a physical shape of the piezoelectric element 16. As a non-limiting example, the piezoelectric element 16 is selectively driven by the control signal having a pre-determined waveform to generate a mechanical oscillation (i.e. ocean wave effect) throughout the piezoelectric element 16. Since the rotor 18 is in mechanical communication (direct or indirect) with the piezoelectric element 16, the oscillation (i.e. ocean wave effect) of the piezoelectric element 16 causes the rotor 18 to rotate.

Specifically, a travelling wave is generated through the piezoelectric element 16 to produce an elliptical motion of particles on a surface of the piezoelectric element 16 in contact with the rotor 18. The elliptical motion of the contact surface of the piezoelectric element 16 propels the rotor 18. It is understood that control of the rotational motion of the rotor 18 depends on friction (i.e. contact force) between the rotor 18 and the piezoelectric element 16, as well as an amplitude and a quality of the travelling wave generated in response to the control signal, as appreciated by one skilled in the art.

Figure 3:
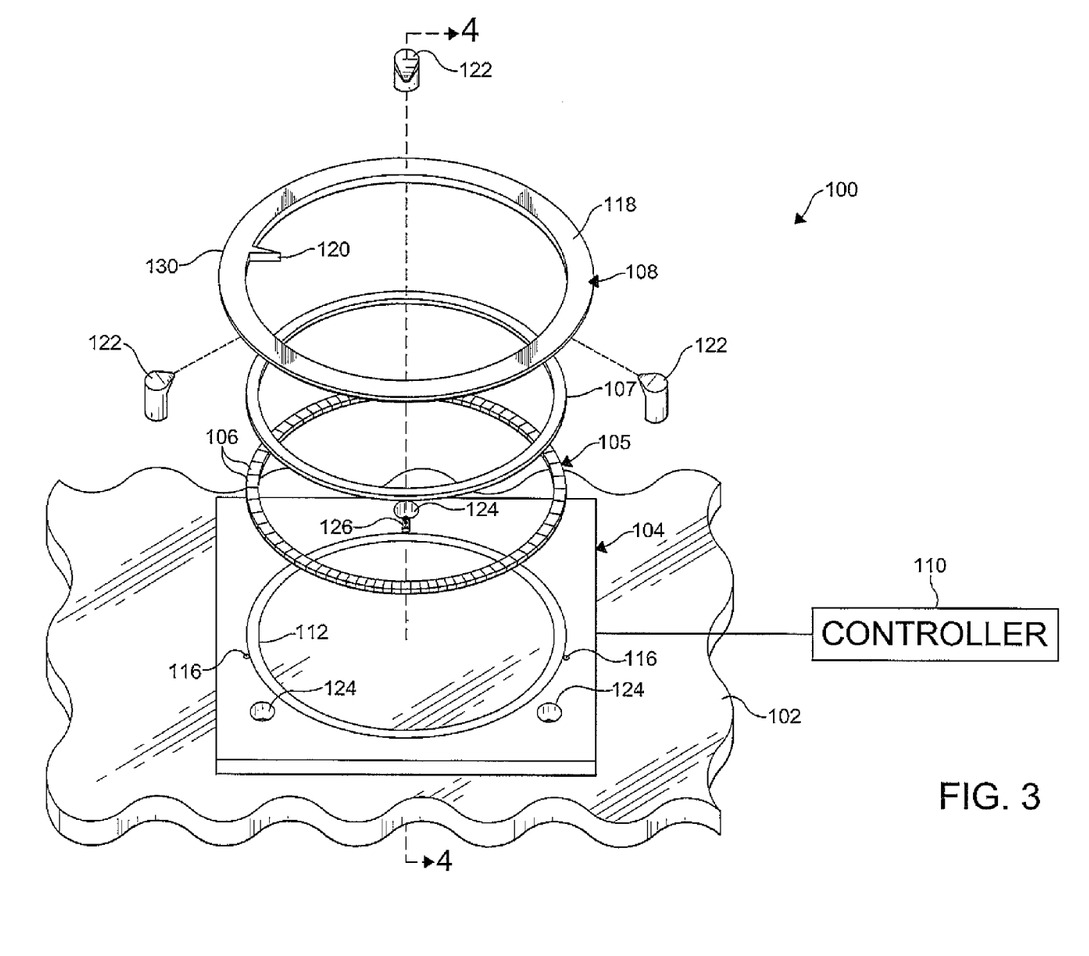
FIG. 3 is an exploded fragmentary perspective view of a display system according to another embodiment of the present invention.
Figure 4:
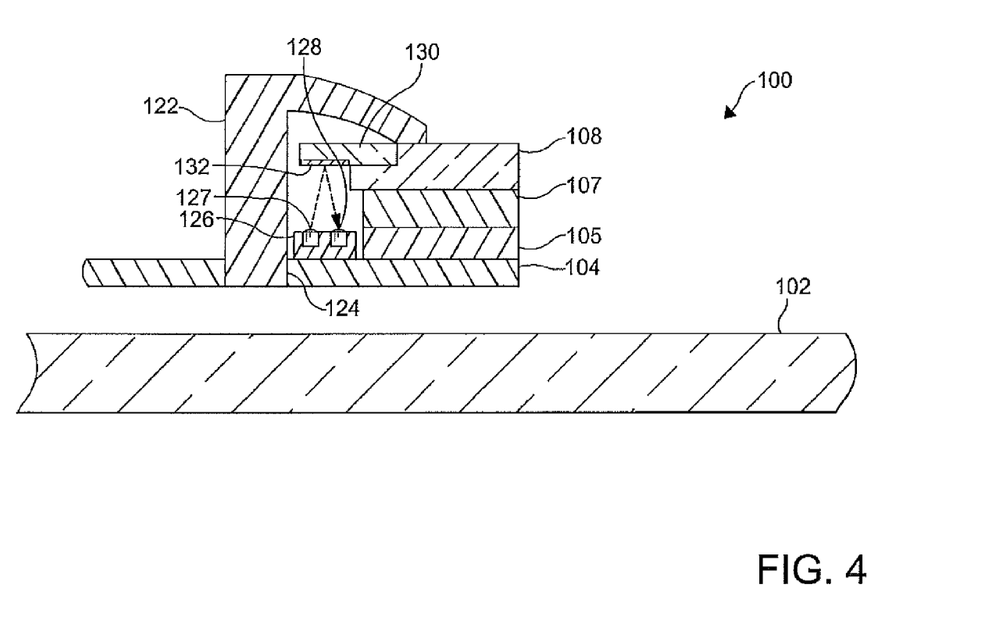
FIG. 4 is a cross-sectional view of the display system of FIG. 3 shown assembled and taken along line 4-4.

FIGS. 3 and 4 illustrate a display system 100 according to another embodiment of the present invention similar to the system 10 except as described below. As shown, the system 100 includes a display 102, a printed circuit board 104, a piezoelectric element 105, a mechanical interface 107, a rotor 108, and a controller 110. It is understood that other elements and components can be included in the system 100 such as interface elements for electrically and mechanically interconnecting components of the system 100, for example.

The display 102 is typically a thin film transistor (TFT) display known in the art. However, the display 102 can be any device for presenting a visual feedback to the user such as a liquid crystal display, a reconfigurable display, an instrument cluster, and the like. The display 102 can also include any indicia (not shown) or graphical markings to communicate information to a user.

In certain embodiments, the printed circuit board 104 may be mounted to a portion of the display 102. In the embodiment shown, the printed circuit board 104 is spaced from the display 102 and overlayed relative to the display 102. It is understood that printed circuit board 104 can be mounted to other structural components (not shown) in order to maintain a relative spatial relationship with the display 102. As a non-limiting example, the printed circuit board 104 is generally rectangular with a centralized aperture 112 formed therein. However, it is understood that the printed circuit board 104 can have any shape and size. A plurality of light sources 116 (e.g. light emitting diodes or the like) is mounted to the printed circuit board. As a non-limiting example, the light sources 116 are arranged to illuminate at least a portion of the rotor 108. Any light sources can be used to illuminate any component of the system 100.

The piezoelectric element 105 is typically formed from a plurality of piezoelectric crystals 106. As a non-limiting example, the piezoelectric element 105 is generally ring shaped. In an operative position, the piezoelectric element 105 is in electrical communication with the printed circuit board 104. As a non-limiting example, the printed circuit board 104 provides a means to selectively energize and electrically ground the piezoelectric element 105.

The mechanical interface 107 is disposed adjacent the piezoelectric element 105 and in direct mechanical communication therewith. The mechanical interface 107 is typically ring shaped and similar in size and shape as the piezoelectric element 105. It is understood that the mechanical interface 107 can be formed from any material having a suitable coefficient of friction with the piezoelectric element 105. It is further understood that the mechanical interface 107 and the rotor 108 can be formed from different materials, thereby maximizing a design flexibility for the rotor 108.

The rotor 108 is disposed adjacent the mechanical interface 107 and in indirect mechanical communication with the piezoelectric element 105. In the embodiment shown, the rotor 108 includes an annular main body 118 having a pointer 120 extending radially inwardly (or outwardly) therefrom. It is understood that the rotor 108 can have any shape and size and can include any structural indicators.

In certain embodiments, a plurality of spring clips 122 is disposed adjacent a periphery of a stacked configuration including at least the printed circuit board 104, the piezoelectric element 105, the mechanical interface 107, and the rotor 108 to maintain a stacked configuration thereof. As shown, a portion of each of the spring clips 122 are received by a mounting aperture 124 formed in the printed circuit board 104. However it is understood that any means for mounting the spring clips 122 can be used. It is further understood that any clip or clamp can be used to secure a stacked configuration of at least the printed circuit board 104, the piezoelectric element 105, the mechanical interface 107, and the rotor 108. It is understood that a contact force (i.e. friction force) between the spring clips 122 and the rotor 108 is pre-determined to allow the rotor 108 to rotate within the spring clips 122. It is further understood the contact force (i.e. spring force) between the spring clips 122 and the rotor 108 is pre-determined to maintain a suitable mechanical communication between the piezoelectric element 105 and the mechanical interface 107.

In certain embodiments, a sensor 126 is mounted on the printed circuit board 104 and in electrical communication therewith. As a non-limiting example, the sensor 126 is disposed on the printed circuit board 104. As a further non-limiting example, the sensor 126 includes a light source 127 and a photo detector 128, which cooperate to determine at least one of a position and a rate of rotation of the rotor 108. Specifically, the light source 127 is arranged to direct light toward a foil 130 coupled to the rotor 108 and extending beyond a periphery of the rotor 108. The foil 130 includes a plurality of spaced apart markings 132. In certain embodiments, the foil 130 is formed from a reflective material and the markings 132 are not light reflective. In other embodiments, the foil 130 is not reflective and the markings 132 are formed from a reflective material. The spaced apart configuration of the markings 132 causes the light emitted from the light source to be reflected toward the photo detector 128 in pulses. The light pulses can be analyzed to determine a position and/or a rate of rotation of the rotor 108. It is understood that a variety of position sensors can be used such as a rotary encoder, for example.

The controller 110 is in electrical communication with the piezoelectric element 105 to provide a control signal thereto. As a non-limiting example, the control signal has at least one of a sinusoidal waveform and a cosinusoidal waveform. As a further non-limiting example, the piezoelectric element 105 is driven to resonance by a two-phase sinusoidal drive voltage, wherein the angle difference between the phases is 90 degrees. However, any waveform can be used. In the embodiment shown, the controller 110 is in direct electrical communication with the printed circuit board 104 and indirect electrical communication with the piezoelectric element 105 via the printed circuit board 104. It is understood that any electrical configuration can be used to transmit the control signal to the piezoelectric element 105.

In operation, at least the printed circuit board 104, the piezoelectric element 105, the mechanical interface 107, and the rotor 108 are configured in stacked relation to one another and disposed adjacent the display 102. In certain embodiments, the printed circuit board 104 is securely mounted to a static structure (not shown) to maintain a position of the printed circuit board 104 relative to the display 102. As a non-limiting example, the spring clips 122 engage a portion of the printed circuit board 104 and a portion of the rotor 108 to maintain a mechanical contact between the piezoelectric element 105 and the mechanical interface 107.

The controller 110 selectively transmits the control signal to the piezoelectric element 105 to energize the piezoelectric element 105 and cause a change in a physical shape of the piezoelectric element 105. As a non-limiting example, the piezoelectric element 105 is selectively driven by the control signal having a pre-determined waveform to generate a mechanical oscillation (i.e. ocean wave effect) throughout the piezoelectric element 105. Since the rotor 108 is in indirect mechanical communication with the piezoelectric element 105, the oscillation (i.e. ocean wave effect) of the piezoelectric element 105 causes the rotor 108 to rotate.

Figure 5:
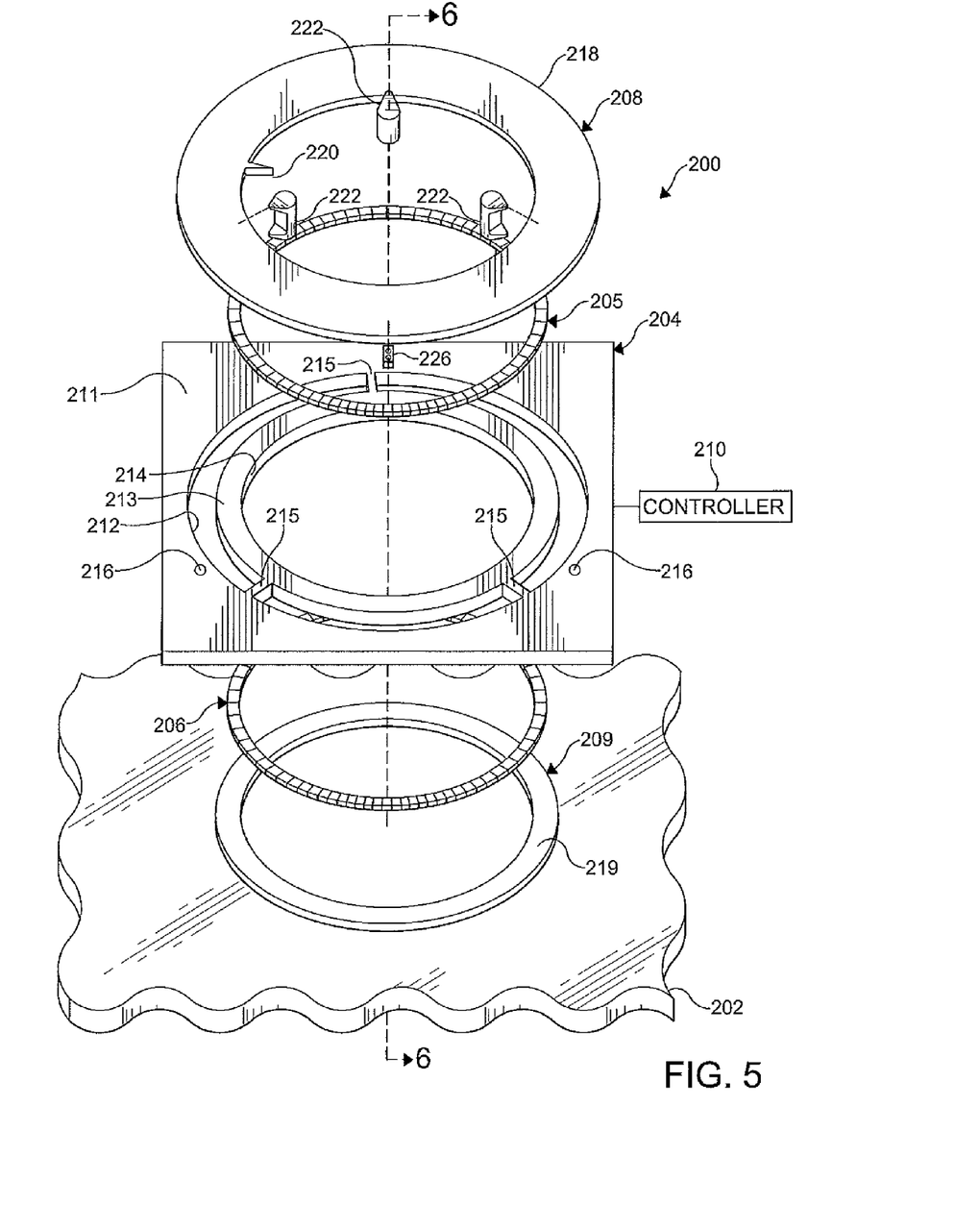
FIG. 5 is an exploded fragmentary perspective view of a display system according to another embodiment of the present invention.
Figure 6:
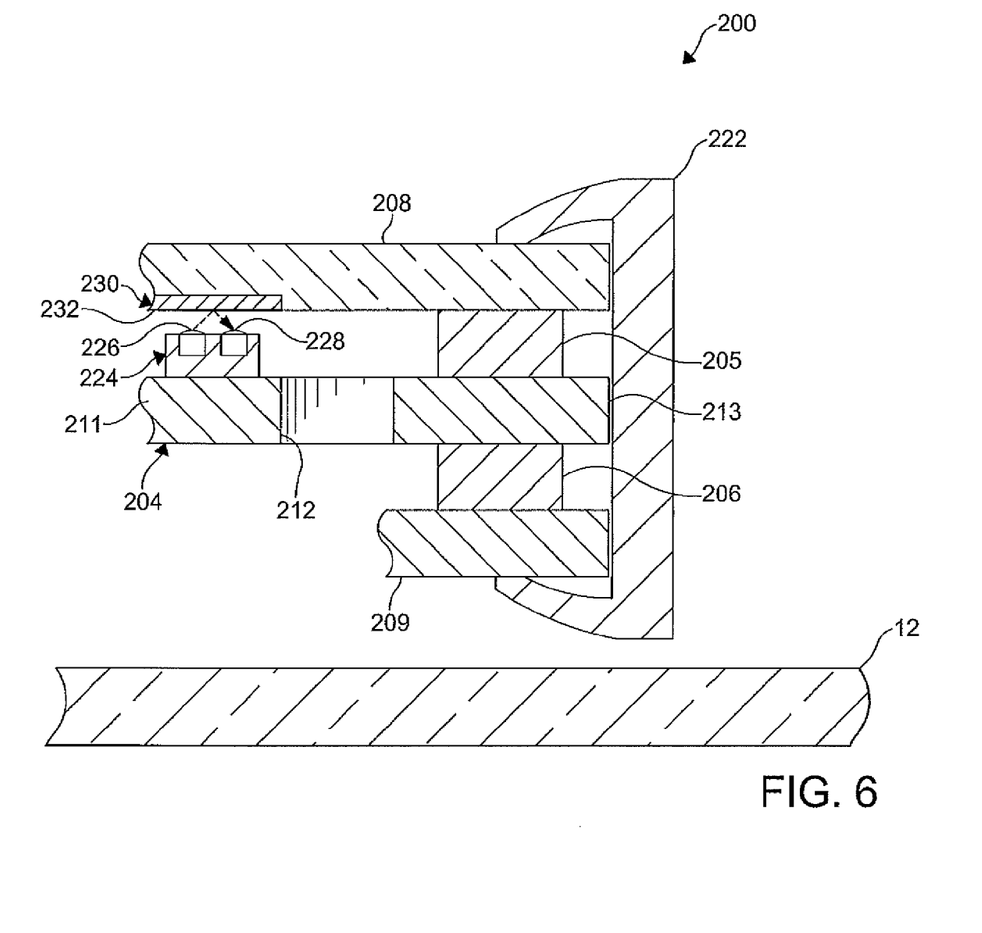
FIG. 6 is a cross-sectional view of the display system of FIG. 5 shown assembled and taken along line 6-6.

FIGS. 5 and 6 illustrate a display system 200 according to another embodiment of the present invention similar to the system 100 except as described below. As shown, the system 200 includes a display 202, a printed circuit board 204, a pair of piezoelectric elements 205, 206, a pair of rotors 208, 209, and a controller 210. It is understood that any number of the piezoelectric elements 205, 206 can be used. It is further understood that other elements and components can be included in the system 200 such as interface elements for electrically and mechanically interconnecting components of the system 200, for example.

In certain embodiments, the printed circuit board 204 may be mounted to a portion of the display 202. In the embodiment shown, the printed circuit board 204 is spaced from the display 102 and overlayed relative to the display 202. It is understood that printed circuit board 204 can be mounted to other structural components (not shown) in order to maintain a relative spatial relationship with the display 202. As a non-limiting example, the printed circuit board 204 has a generally rectangular main body 211 with an aperture 212 formed therein. An annular or ring-shaped inner section 213 of the printed circuit board 204 is disposed within the aperture 212 and spaced from the main body 211. The inner section 213 of the printed circuit board 204 defines a centralized aperture 214 through which at least a portion of the display 202 is viewable. A plurality of connectors 215 are disposed between the main body 211 and the inner section 213 of the printed circuit board 204 to provide a means for electrical communication therebetween. It is understood that the connectors 215 allow a pre-determined freedom of movement between the inner section 213 and the main body 211. It is further understood that the printed circuit board 204 can have any shape and size.

In certain embodiments, a plurality of light sources 216 (e.g. light emitting diodes or the like) is mounted to the main body 211 of the printed circuit board 204. As a non-limiting example, the light sources 216 are arranged to illuminate at least a portion of at least one of the rotors 208, 209. Any light sources can be used to illuminate any component of the system 200.

Each of the piezoelectric elements 205, 206 is typically formed from a plurality of piezoelectric crystals. As a non-limiting example, each of the piezoelectric elements 205, 206 is generally ring shaped. In an operative position, each of the piezoelectric element 205, 206 is in electrical communication with the printed circuit board 204 (e.g. the inner section 213). As a non-limiting example, the printed circuit board 204 provides a means to selectively energize and electrically ground the piezoelectric elements 205, 206.

As shown, the piezoelectric element 205 is disposed on a first side of the printed circuit board 204 adjacent the inner section 213 and the piezoelectric element 206 is disposed on a side of the printed circuit board 204 opposite the piezoelectric element 205. However, other configurations can be used.

The rotor 208 is disposed adjacent the piezoelectric element 205 and in mechanical communication (direct or indirect) therewith. In the embodiment shown, the rotor 208 includes an annular main body 218 having a pointer 220 extending radially inwardly (or outwardly) therefrom. It is understood that the rotor 208 can have any shape and size and can include any structural indicators.

The rotor 209 is disposed adjacent the piezoelectric element 206 and in mechanical communication (direct or indirect) therewith. In the embodiment shown, the rotor 209 includes an annular main body 219. It is understood that the rotor 209 can have any shape and size and can include any structural indicators.

In certain embodiments, a plurality of spring clips 222 is disposed adjacent a radially inward edge of the inner section 213 of the printed circuit board 204 defining the centralized aperture 214. The spring clips 222 engage each of the rotors 208, 209 to provide a clamping force to maintain a stacked configuration of at least the printed circuit board 204, the piezoelectric elements 205, 206, and the rotors 208, 209. As shown, the spring clips 222 are generally C-shaped. However, any clip or clamp can be used to secure a stacked configuration of at least the printed circuit board 204, the piezoelectric elements 205, 206, and the rotors 208, 209. It is understood the clamping force (i.e. spring force) between the spring clip 222 and each of the rotors 208, 209 is pre-determined to maintain a suitable mechanical communication between the piezoelectric element 205, 206 and each of the rotors 208, 209.

In the embodiment shown, a contact force (i.e. friction force) between the spring clips 222 and each of the rotors 208, 209 is pre-determined to maintain a relative position therebetween and to allow the spring clips 222 to rotate along with the rotors 208, 209. However, in certain embodiments, a contact force (i.e. friction force) between the spring clips 222 and the rotors 208, 209 is pre-determined to allow the rotors 208, 209 to rotate within the spring clips 222.

In certain embodiments, a sensor 224 is mounted on the main body 211 of the printed circuit board 204 and in electrical communication therewith. As a non-limiting example, the sensor 224 is disposed on the printed circuit board 204. As a further non-limiting example, the sensor 224 includes a light source 226 and a photo detector 228, which cooperate to determine at least one of a position and a rate of rotation of at least one of the rotors 208, 209. Specifically, the light source 226 is arranged to direct light toward a foil 230 coupled to at least one of the rotors 208, 209. The foil 230 includes a plurality of spaced apart markings 232. In certain embodiments, the foil 230 is formed from a reflective material and the markings 232 are not light reflective. In other embodiments, the foil 230 is not reflective and the markings 232 are formed from a reflective material. The spaced apart configuration of the markings 232 causes the light emitted from the light source to be reflected toward the photo detector 228 in pulses. The light pulses can be analyzed to determine a position and/or a rate of rotation of at least one of the rotors 208, 209. It is understood that a variety of position sensors can be used such as a rotary encoder, for example.

The controller 210 is in electrical communication with each of the piezoelectric elements 205, 206 to provide a control signal thereto. As a non-limiting example, the control signal has at least one of a sinusoidal waveform and a cosinusoidal waveform. As a further non-limiting example, each of the piezoelectric elements 205, 206 is driven to resonance by a two-phase sinusoidal drive voltage, wherein the angle difference between the phases is 90 degrees. However, any waveform can be used. In the embodiment shown, the controller 210 is in direct electrical communication with the printed circuit board 204 and indirect electrical communication with each of the piezoelectric elements 205, 206 via the printed circuit board 204. It is understood that any electrical configuration can be used to transmit the control signal to each of the piezoelectric elements 205, 206.

In operation, at least the printed circuit board 204, the piezoelectric elements 205, 206, and the rotors 208, 209 are configured in stacked relation to one another and disposed adjacent the display 202. In certain embodiments, the main body 211 of the printed circuit board 204 is securely mounted to a static structure (not shown) to maintain a position of the main body 211 of the printed circuit board 204 relative to the display 202. As a non-limiting example, the spring clips 222 engage a portion of the rotor 208 and a portion of the rotor 209 to maintain a mechanical contact between the piezoelectric elements 205, 206 and each of the rotors 208, 209.

The controller 210 selectively transmits the control signal to at least one of the piezoelectric elements 205, 206 to energize the piezoelectric elements 205, 206 and cause a change in a physical shape of the piezoelectric element 205, 206. As a non-limiting example, each of the piezoelectric elements 205, 206 is selectively driven by the control signal having a pre-determined waveform to generate a mechanical oscillation (i.e. ocean wave effect) throughout the respective piezoelectric element 205, 206. Since the rotors 208, 209 are in mechanical communication with the piezoelectric element 205, 206, respectively, the oscillation (i.e. ocean wave effect) of each of the piezoelectric elements 205, 206 causes the respective rotor 208, 209 to rotate.

The display system 10, 100, 200 provides a means for selectively controlling a motion of a mechanical pointer in various directions, while maximizing a viewable area of a display associated with the pointer.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:
1. A display system comprising:
 a display having a surface at least partially viewable for presenting a visual output to a user;
 a piezoelectric element overlaying at least a portion of the surface of the display; and
 a rotor disposed adjacent the piezoelectric element and in mechanical communication therewith, wherein a selective energizing of the piezoelectric element causes a rotational movement of the rotor.

2. The system according to claim 1, wherein the display is a thin-film-transistor type display.

3. The system according to claim 1, wherein the piezoelectric element is formed from a plurality of piezoelectric crystals.

4. The system according to claim 1, wherein the rotor is generally ring shaped.

5. The system according to claim 1, wherein the rotor includes a pointer extending therefrom.

6. The system according to claim 1, further comprising a means for securing the piezoelectric element and the rotor in a stacked configuration.

7. The system according to claim 1, further comprising a light emitting diode disposed adjacent the rotor to illuminate at least a portion of the rotor.

8. The system according to claim 1, further comprising a sensor disposed adjacent the rotor to detect at least one of a rotational speed and a rotational position of the rotor.

9. A display system comprising:
- a display having a surface at least partially viewable for presenting a visual output to a user;
- an annular piezoelectric element overlaying at least a portion of the surface of the display, the piezoelectric element having an aperture formed therein, wherein the visual output of the display is viewable through the aperture; and
- a rotor disposed adjacent the piezoelectric element and in mechanical communication therewith, wherein a selective energizing of the piezoelectric element cause a rotational movement of the rotor.

10. The system according to claim 9, further comprising a mechanical interface disposed between the piezoelectric element and the rotor and in mechanical communication with the piezoelectric element and the rotor.

11. The system according to claim 9, wherein the piezoelectric element is formed from a plurality of piezoelectric crystals.

12. The system according to claim 9, wherein the rotor is generally ring shaped.

13. The system according to claim 9, wherein the rotor includes a pointer extending radially inwardly therefrom.

14. The system according to claim 9, further comprising a means for securing the piezoelectric element and the rotor in a stacked configuration.

15. The system according to claim 9, further comprising a light emitting diode disposed adjacent the rotor to illuminate at least a portion of the rotor.

16. The system according to claim 9, further comprising a sensor disposed adjacent the rotor to detect at least one of a rotational speed and a rotational position of the rotor.

17. A display system comprising:
- a display for presenting a visual output to a user;
- a printed circuit board overlaying the display, the circuit board having an aperture formed therein, wherein the visual output of the display is viewable through the aperture;
- an annular piezoelectric element disposed adjacent the printed circuit board and in electrical communication therewith; and
- an annular rotor disposed adjacent the piezoelectric element and in mechanical communication therewith, wherein a selective energizing of the piezoelectric element causes a rotational movement of the rotor and the visual output of the display is viewable through a center of the rotor.

18. The system according to claim 17, further comprising a means for securing the piezoelectric element and the rotor in a stacked configuration.

19. The system according to claim 17, further comprising a light emitting diode disposed adjacent the rotor to illuminate at least a portion of the rotor.

20. The system according to claim 17, further comprising a sensor disposed adjacent the rotor to detect at least one of a rotational speed and a rotational position of the rotor.

* * * * *